Jan. 2, 1962     J. H. McAULEY     3,015,380
FLEXIBLE CHAIN
Filed May 8, 1959     2 Sheets-Sheet 1
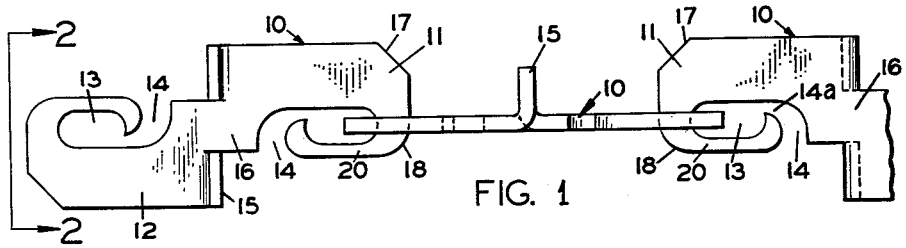
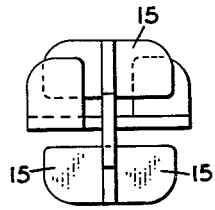
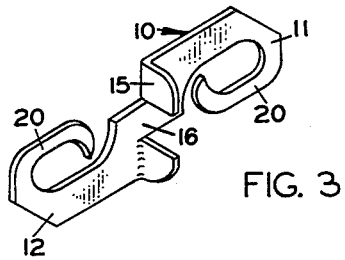
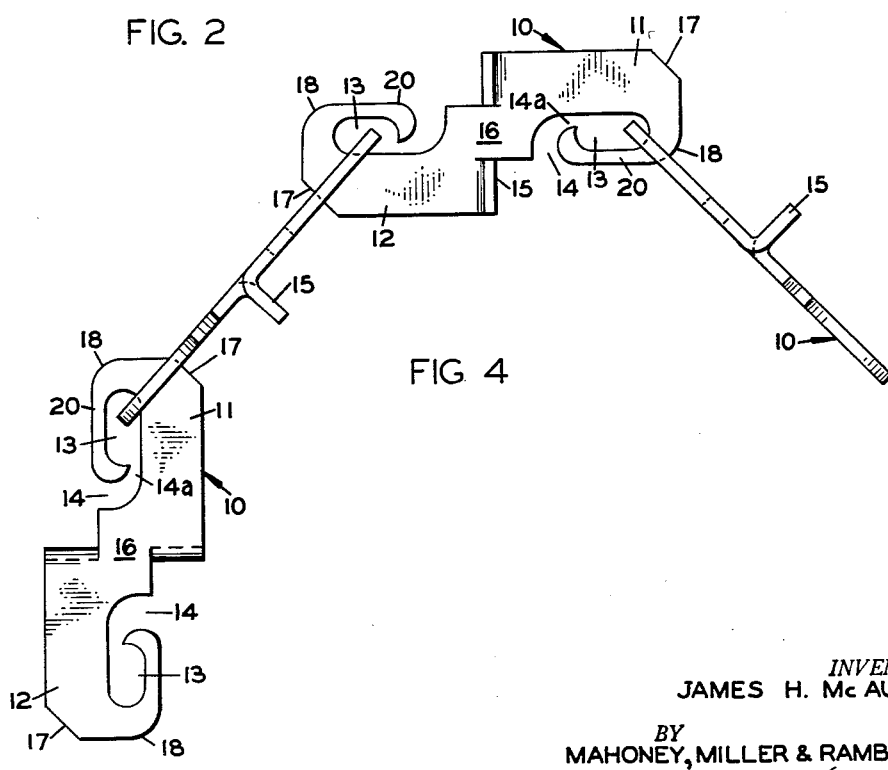
INVENTOR.
JAMES H. McAULEY
BY MAHONEY, MILLER & RAMBO, ATTY'S.

Jan. 2, 1962 J. H. McAULEY 3,015,380
FLEXIBLE CHAIN
Filed May 8, 1959 2 Sheets-Sheet 2
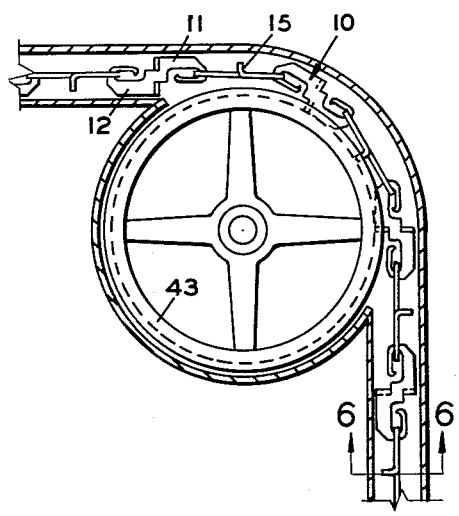
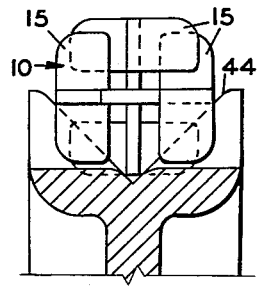
FIG. 8
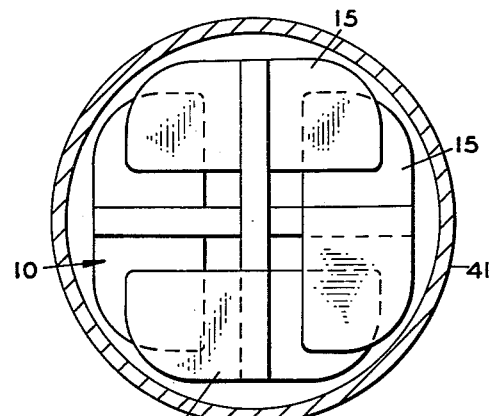
FIG. 6
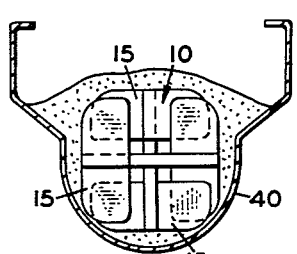
FIG. 7
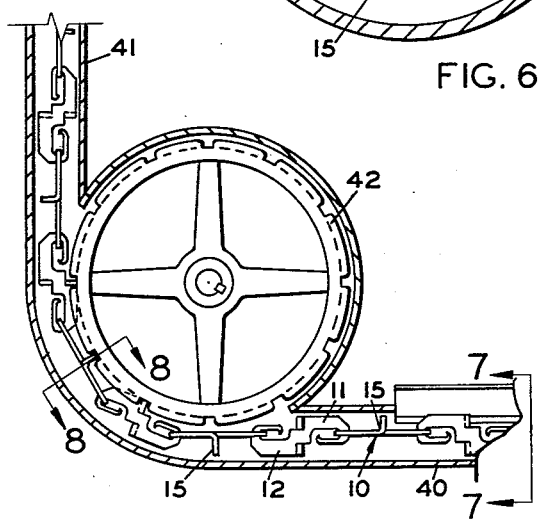
FIG. 5
INVENTOR.
JAMES H. McAULEY
BY
MAHONEY, MILLER & RAMBO, ATTY'S.
BY

United States Patent Office 3,015,380
Patented Jan. 2, 1962

3,015,380
FLEXIBLE CHAIN
James H. McAuley, Bremen, Ohio, assignor to McAuley Manufacturing, Inc., Bremen, Ohio, a corporation of Ohio
Filed May 8, 1959, Ser. No. 812,001
5 Claims. (Cl. 198—176)

My invention relates to a flexible chain. It has to do, more particularly, with a chain which is particularly suitable for moving loose granular material, such as poultry feed, along a feed conduit extending in both horizontal and vertical directions.

The chain according to this invention is extremely flexible so that it can move around sprockets or guide drums in different relative planes. Thus, the chain may travel around sprockets or guides located relatively in different vertical and horizontal planes or components thereof. Furthermore, the chain may twist about its own axis. It can be driven with ease by suitable sprockets or can merely pass around suitable guide drums. The chain is such that it is particularly suitable for use in conduits of partial or complete circular cross-section which are more economical to use than conduits of angular cross-section. Each link of the chain is of such shape that it can fit snugly in a conduit that has a cross-section of circular or segmental form, and will cooperate effectively therewith to move material such as poultry feed therealong. Even if the conduit is vertical, when it is of circular cross-section, the chain links will serve to lift the material therein. The chain of this invention is formed of links which are simple, inexpensive, stampings that can be assembled with ease into any desired lengths. Furthermore, after once being assembled, links can be removed with ease. Also, due to its unusual shape, each link is exceptionally strong in relation to its weight.

Various other objects will be apparent.

The accompanying drawings illustrate the preferred embodiment of my invention but it is to be understood that specific details thereof may be varied without departing from the basic principles of my invention.

In these drawings:

FIGURE 1 is an elevational view of a length of chain formed according to my invention.

FIGURE 2 is an end elevational view of the length of chain of FIGURE 1.

FIGURE 3 is an isometric view of one of the links of the chain.

FIGURE 4 is an elevational view illustrating how the chain can flex.

FIGURE 5 is a vertical sectional view through the conduits of a poultry-feeding device showing that the chain can function to move the feed therein vertically as well as horizontally.

FIGURE 6 is an enlarged transverse sectional view taken along line 6—6 of FIGURE 5 through the circular cross-section vertical conduit with which the chain cooperates.

FIGURE 7 is an enlarged transverse sectional view taken along line 7—7 of FIGURE 5 through the trough-like horizontal conduit with which the chain cooperates.

FIGURE 8 is a transverse sectional view taken along line 8—8 of FIGURE 5 through a suitable driving sprocket and the chain associated therewith.

With reference to the drawings, I have illustrated in FIGURE 1 a flat chain composed of the interlocking links 10 which are so connected together that the links may pivot relative to each other vertically or horizontally relative to the plane of its travel, or may twist relative to each other about the longitudinal axis of the chain. An important feature of this present invention is that each link is provided with material moving blades which will cooperate very effectively with the wall of the conduit in which it is disposed, especially if the conduit has a cross-section of circular or segmental form. Therefore, when the chain is traveling in a horizontal trough or conduit, the blades on the successive links will move the poultry feed along the bottom of the trough. On the other hand, when the chain is moving up an incline or in a vertical direction through a conduit, the blades will serve as elevators for lifting the material through the vertical conduit. The blades are so positioned on the links that regardless of how the successive links are twisted relatively about the axis of the chain, the material will be moved effectively along the conduit.

Each of the links 10 takes the form illustrated in the drawings. Each link is formed by a stamping operation from suitable sheet metal. All of the links 10 are identical.

Each link 10 comprises a pair of opposed flat hook-shaped ends 11 and 12 which are in the same flat plane but are reversed relative to each other. Each hook-shaped end has a pintle-receiving slot 13 formed therein which extends longitudinally thereof and which has a mouth 14 opening outwardly at its edge. It will be noted that the mouths 14 of the two slots 13 open at opposite edges. In other words, one hook 11 turns toward one edge of the link 10 and the other hook 12 turns toward the opposite edge but both have flat bodies which are in the same plane. A pair of material-moving blades 15 is formed on each link, extending from the plane of the flat hook-shaped ends 11 and 12, the blades of the pair being at opposite edges of a hook-connecting portion 16 which connects the ends 11 and 12. This hook-connecting portion 16 is integral with the ends 11 and 12 and the blades 15 are also integral with the ends, both blades projecting in the same direction from the flat plane thereof and being disposed in a single plane substantially at right angles to the main plane of the link in which the ends 11 and 12, and the connection 16, lie.

It will be apparent that each link can be stamped flat from a rectangular blank piece of sheet metal of minimum size which will simultaneously form the slots 13 and the blades 15 as well as trim the blank. Then the blades 15 will be bent at right angles to the main plane of the link. Obviously, there will be minimum waste of material. Two opposite corners are angled, as indicated at 17, and the other two corners are rounded, as indicated at 18.

With each link 10 formed in this manner, it will be apparent that at each end of the link there is a transversely extending pintle portion 20 and the maximum width or depth in the longitudinal direction of this portion is less than the minimum width of the inwardly opening mouth 14 but is greater than that of the communicating throat 14a which leads longitudinally into the slot 13. The slot 13 is transversely wider than the indicated width of the pintle portion 20 and the mouth 14a is of greater transverse width than the thickness of the pintle portion which is the same as the remainder of the link. This relative arrangement and dimensioning permits ease of assembly and disassembly of adjacent links. To assemble, the pintle portion 20 of one link is passed flat inwardly through the mouth 14 and is then pulled outwardly through the throat 14a into the slot 13. The pintle portion 20 can tilt or rock longitudinally in the associated slot 13 so that the links can swing relatively in a vertical or horizontal plane as indicated in FIGURE 4. The outer end of each slot is curved to facilitate this relative rocking movement. Also, adjacent links can twist relatively about their longitudinal axis since the flat pintle portions 20 can tilt or rock transversely in the associated slot 13.

The chain may be used in various ways but in FIGURES 5 to 8 we have illustrated one installation in which it can be used. This illustration shows it passing through a lower horizontal trough 40 which is open along its top but is of segmental cross-section at its bottom, the curvature of the bottom being such that its diameter is slightly greater than the width of the links at the blades 15. Thus, the chain will snugly fit in the horizontal part of the trough, as shown in FIGURE 7, and the blades 15 will move the material therealong. The chain may also pass through a communicating vertical conduit 41 which is of tubular or circular cross-section and of a diameter slightly greater than the width of the chain at the blades 15, as shown in FIGURE 6. The chain may be passed around any suitable number of drive sprockets 42 and guide wheels 43 in various planes. The sprockets 42 may have a V-groove 44 (FIGURE 8) in their periphery for receiving the chain, the sides of the groove being provided with driving cleats. The guide wheels 43 may be provided with plain V-grooves or arcuate grooves for receiving the chain. The feed will be moved horizontally along the trough 40 by the blades 15. As the chain passes vertically, the blades 15 will serve as elevator cleats for elevating the feed through the vertical tube 41. As indicated in the sectional view in FIGURE 6, after the chain has moved through the conduit 41 for a sufficient period at a sufficient speed, the conduit will be substantially filled with a column of material by the lifting action of the blades 15. It will be noted that the position of the blades 15 alternates in each successive link of the chain. Taking any three links, as shown in FIGURE 1 and as apparent from FIGURE 7, it will be noted that in the middle link the plane of the blades 15 will extend transversely in one direction, for example horizontal, and the planes of the blades 15 in the other links will be at right angles or vertical. Also, the blades 15 of the two links on opposite sides of the center link will project in opposite directions. Thus, as shown in FIGURE 6, if the conduit is circular substantially its entire area will be covered by the blades 15 of three successive links. It will be apparent that the chain can again pass horizontally in another trough 40 to move the feed therealong.

The pintle portions 20 will, as shown, fit loosely in the slots 13 to permit considerable movement of the links relative to each other in all directions. As the chain passes vertically around the sprockets and guide wheels, the pintles 20 will turn, rock, or slide in the slots 13, permitting the necessary vertical flexing of the chain. Horizontal or vertical flexing will be permitted, as shown in FIGURE 4. Since the corners 17 are angled and the corners 18 are curved, there will be no binding between links when they turn relatively laterally or vertically, as shown in FIGURE 4. Twisting of the links relative to each other about the longitudinal axis of the chain will be permitted because of the loose fit of each pintle 20 in the cooperating slot 13.

It will be apparent from the above description that I have provided a chain which will effectively move granular material in a conduit extending either horizontally, at an inclination, or vertically. This effective feed to any elevation is provided by the material-moving blades on each link which is at right angles relative to the plane of the body of the link. The chain is made from interlocking links of inexpensive stampings. The links are so constructed relatively and interfitted with each other that the chain can flex in any direction relative to its longitudinal axis and can twist about such axis.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A chain formed from identical interlocking links interlocked and positioned at right angles to each other, each of said links comprising a flat body portion having opposed hook-shaped ends in the plane of the flat body portion, and a material-moving blade projecting from one flat surface of the flat body portion at an angle thereto intermediate said hook-shaped ends.

2. A chain formed from identical interlocking links interlocked and positioned at right angles to each other, each of said links comprising a flat body portion having hook-shaped ends in the plane of the flat body portion which extend inwardly toward each other, one hook-shaped end opening at one side edge of the body portion and the other hook-shaped end opening at the other side edge of the body portion, and material-moving blades extending outwardly from the flat plane of the body portion at one flat surface thereof and at an angle thereto.

3. A chain formed from identical interlocking links interlocked and positioned at right angles to each other, each of said links comprising an integral flat body formed of two hook-shaped ends with a connecting portion therebetween all being in a common plane, said hook-shaped ends being reversed so that they extend toward each other, one of the hook-shaped ends opening at one edge of the body and the other hook-shaped end opening at the other edge of the body, and material-moving blades disposed transversely of the connecting portion at each edge thereof and extending from one flat surface thereof in a plane at right angles to the flat plane of the body.

4. A chain according to claim 3 in which each hook-shaped end has an elongated longitudinally-extending slot with a mouth leading from the edge laterally thereinto and with a communicating throat joining the mouth to the inner end of the slot, said end having a transverse pintle portion at the outer end of the slot, said pintle portion being of a minimum width less than the width of the mouth and being of a minimum thickness less than that of the throat.

5. A chain according to claim 4 in which each hook-shaped end has its corner adjacent said slot rounded and its other corner angled.

References Cited in the file of this patent
UNITED STATES PATENTS

| | | |
|---|---|---|
| 30,797 | Blocker | Dec. 4, 1860 |
| 545,214 | Swedlund | Aug. 27, 1895 |
| 1,555,577 | Horner | Sept. 29, 1925 |
| 1,697,963 | Redler | Jan. 8, 1929 |
| 2,297,632 | Mosley | Sept. 29, 1942 |
| 2,435,892 | Mall | Feb. 10, 1948 |
| 2,438,083 | Whitney | Mar. 16, 1948 |
| 2,446,685 | Barker | Aug. 10, 1948 |
| 2,784,833 | Heidinger | Mar. 12, 1957 |